June 21, 1966  A. J. SCHWEMIN  3,256,742
FLUID GYROSCOPIC PRECESSOR
Filed April 15, 1964
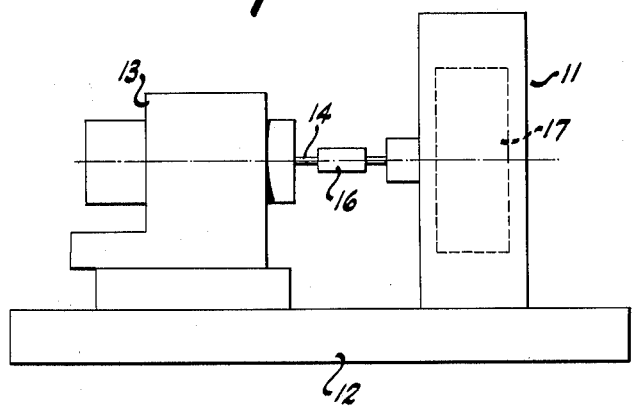
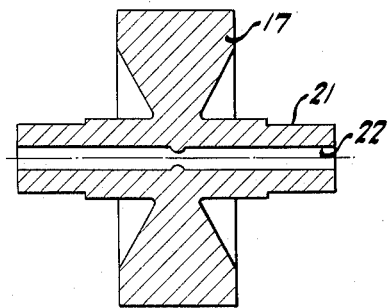
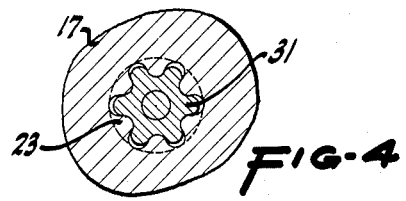
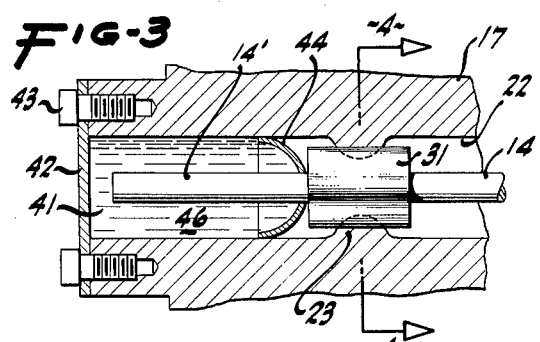
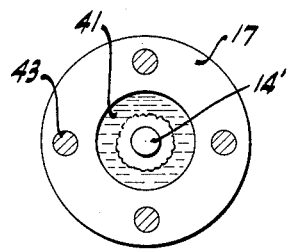
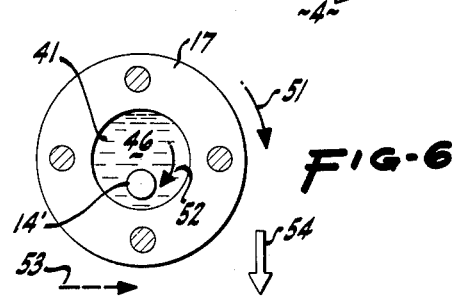
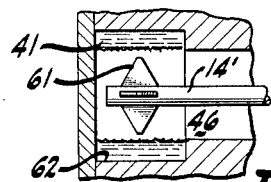
INVENTOR.
ARNOLD J. SCHWEMIN
BY
ATTORNEYS United States Patent Office 3,256,742
Patented June 21, 1966

3,256,742
FLUID GYROSCOPIC PRECESSOR
Arnold J. Schwemin, Oakland, Calif., assignor, by mesne assignments, to Bell & Howell Company, Chicago, Ill., a corporation of Illinois
Filed Apr. 15, 1964, Ser. No. 359,868
12 Claims. (Cl. 74—5.4)

The present invention is directed to the provision of a readily controllable and simply constructed precessor for a gyroscope.

In the manifold utilizations of gyroscopes, there are many instances in which it is desirable, and in fact necessary, to reorient the gyroscope in space and to precisely control the degree and direction of the reorientation. In a gyroscope rotor, which is symmetrical and rotates without restraint, a torque applied at right angles to the spin axis will precess the rotor along an axis which is perpendicular to the spin axis and torque axis. Controlled gyroscope reorientation requires a precise direction of applied torque in order to preclude oscillatory or random precession. Unfortunately, it is commonly found that gyroscopic precessing devices are somewhat complex, owning to the necessity of applying a unidirectional vector force to a rotating element. It is extremely important in this respect that the vector force applied to the rotor of the gyroscope have no components in any direction other than the one desired, for otherwise some other type of precession will occur. The mechanical and/or electrical complexities involved in insuring the application of a vector precessing force in exactly the right direction to produce the desired precession poses a difficult problem. For many applications of gyroscopes, particularly small gyroscopes, complex precessing equipment is not applicable, either because of undue cost or size. The foregoing is particularly emphasized in the field of optics, wherein gyroscopic stabilization of optical systems may be employed in quite small devices, such as cameras for example.

The present invention provides an extremely simple, reliable, and accurate gyroscope precessor, requiring almost no additional space beyond that normally associated with a small gyroscope itself. Although the invention is not limited to small gyroscopes, it is particularly applicable thereto.

The invention described below is applicable to produce a unidirectional vector precessing torque upon the rotor of an otherwise free gyroscope to thereby accurately precess the gyroscope in a predetermined manner. The invention is, however, limited to precession through a very small angle. In many applications of gyroscopic control, only minute gyroscopic precessions are required, and it is to this field that the present invention is directed. Not only does the present invention provide for a simple and economical manner of precessing gyroscopes, but furthermore, provides a maximum degree of control over the precessing characteristics. Thus, for example, in an application wherein a gyroscope is employed to maintain some unit or system stable in space, the present invention is adapted to apply a precessing torque to the gyroscope for changing this spatial orientation, only after some predetermined variation of the system from an initial orientation.

One advantageous application of the present invention is to be found in the field of stabilized optics, wherein certain elements of a complex lens system are gyroscopically controlled to maintain a fixed line of sight, and other elements are adapted to accommodate limited movement without affecting the lens system. A system of this type is disclosed, for example, in copending application of Luis W. Alvarez, Serial No. 308,486, filed September 12, 1963 for "Stabilized Optics," and assigned to the same assignee as this application. In general, stabilized optical systems applied to moving picture cameras, for example, are applicable to accommodate random vibrations or oscillations of the camera housing without influencing the image applied to film therein. This application does, however, require that the entire camera be capable of controlled movement as in "panning." For controlled movement of the camera housing beyond some predetermined minimum amount, the present invention serves to precess the gyroscope controlling certain lens elements so that the gyroscope follows the housing movement, and consequently, there is attained a stabilized optical system both for relatively immovable camea positons and moving camera circumstances.

The present invention provides a fluid medium through which there is applied a vector torque upon a gyroscope rotor in such a direction as to precess the rotor as desired. The fluid employed herein is quite viscous, and is engaged by the gyroscope rotor shaft, as well as the rotor itself, so that predetermined variations between coaxial shaft and rotor alignment does establish a precessing torque in the proper direction to reorient the gyroscope rotor parallel to the gyroscope drive shaft.

A preferred embodiment of the present invention is illustrated in the accompanying drawings, wherein:

FIGURE 1 is a side elevational view of a gyroscope unit including drive motor, gyroscope rotor, and mounting means;

FIGURE 2 is a central sectional view of the gyroscope rotor taken in a plane through a gyroscope drive shaft, but not including the drive shaft;

FIGURE 3 is an enlarged sectional view of the central portion of the rotor taken in a median plane;

FIGURE 4 is an enlarged partial sectional view taken in the plane 4—4 of FIGURE 3 and showing interconnection of the rotor and drive shaft;

FIGURE 5 is an end view of the rotor as shown in FIGURE 3 with the end plate removed and illustrating one modification of the invention;

FIGURE 6 is a traverse view taken in the same plane as FIGURE 5, but illustrating an off-center rotor and shaft alignment together with indications of the forces produced thereby to precess the rotor; and FIGURE 7 is a schematic illustration of a further modification of the invention.

Considering now the present invention in some detail and referring to the drawings, a conventional, small gyroscope 11 is shown to be mounted upon a base 12 which also mounts a small drive motor 13. This drive motor, preferably electric, has a drive shaft 14 extending therefrom through a flexible connection 16 into engagement with a gyroscope rotor 17 for continued rotation of this rotor to establish a gyroscopic action. Inasmuch as the elements, properties, and operations of gyroscopes quite well known in the art, it is not attempted herein to provide a full illustration or description of the necessary gimbal mountings for gyroscopic rotor or other portions of a conventional gyroscope. There is illustrated in FIGURE 2 the gyroscope rotor 17 of the present invention, and same will be seen to comprise a disc formed of metal, such as brass, with a central cylinder extending axially from both sides thereof. This rotor cylinder 21 is formed integrally with the remaining portion of the rotor which may, as illustrated, be undercut adjacent the cylinder to maximize rotary weight at the periphery of the rotor. Suitable bearing surfaces may be formed about the outer ends of the rotor cylinder 21, and a central, axis bore 22 extends through the rotor cylinder.

Rotational drive of the rotor 17 is accomplished by the motor shaft 14 extending through axial bore 22 in the rotor cylinder 21. Within the bore 22 and on the central plane of the rotor, there are provided a plurality of inwardly extending teeth 23, as best seen in FIGURES 3 and 4. Longitudinally of the cylinder 21, these teeth 23 have a limited extension and, furthermore, have a curved configuration, as illustrated in FIGURE 3. It is by means of these teeth that engagement is made with the motor shaft 14.

There is illustrated in FIGURES 3 and 4 an enlarged view of the rotor and shaft connection. Upon the drive shaft 14 there is milled or otherwise formed, a gear 31 having a substantial length longitudinally of the shaft 14, and a plurality of teeth peripherally thereabout of an appropriate size and dimension to mesh with the teeth 23 upon the rotor itself. This gear 31 extends radially outward about the shaft, so that the gear teeth then are disposed radially outward thereof, and in manufacture, the gear teeth are formed and then the shaft turned down to a smaller diameter. The shaft 14 extends substantially through the rotor cylinder 21 with the gear 31 disposed at a distance from the shaft end, so as to thereby mesh with the teeth 23 upon the rotor.

It will be seen that the foregoing drive arrangement provides for driven rotation of the rotor by rotation of the motor shaft 14. In addition, the transverse arcuate section of each of the teeth 23 on the rotor provides the equivalent of a universal joint at the drive connection of shaft and rotor. It will be seen that it is possible for the shaft to pivot relative to the axis of the rotor, and yet to remain in drive engagement therewith. The curved tooth surface of the rotor teeth maintain driving engagement with the gear 31 upon the drive shaft, even though the rotor and shaft are out of axial alignment.

With the foregoing drive arrangement, it is thus possible for the mounting plate 12 with the motor 13 thereon to be moved out of original alignment with the gyroscope rotor, and yet for the gyroscope rotor to be continuously driven. Under the circumstances wherein it is desired to have the gyroscope follow movement of the base platform 12 and gear attached thereto, the present invention provides for the application to the gyroscope rotor of a precessing torque in such a direction as to precess the gyro and thereby realign it with the remainder of the apparatus, as illustrated in FIGURE 1. This precessing torque is herein provided through the medium of a viscous fluid 41 disposed in a compartment defined in the rotor cylinder 21. This compartment is defined by an end plate 42 secured to the opposite end of the rotor cylinder 21 from the motor 13, as by means of bolts 43. Adjacent the gear 31 a fluid seal is provided in the form of a small flexible hemispherical member 44. This hemispherical seal 44 may be formed of a thin, flexible plastic, for example, the seal is oriented with the convex side thereof adjacent, and in fact contacting, the gear 31 about the drive shaft 14. The seal also is pierced so that the outer extremity 14' of the drive shaft extends therethrough, and the outer diameter of the hemispherical seal is made slightly greater than the internal diameter of the bore 22, so that the seal fits tightly against the wall of the bore and also tightly fits the shaft, to thereby seal the volume to the left thereof in FIGURE 3. As a consequence of this configuration, there is defined a closed chamber 46 within the bore 22 and between the end plate 42 and seal 44. Within this chamber there is disposed a viscous fluid 41, which may, for example, comprise a relatively heavy grease, or the like. Into this chamber 46 extends the outward extremity 14' of the drive shaft.

In normal operation of the gyroscope with the rotor 17 thereof driven through the shaft 14 by the electric motor 13, axial alignment of the shaft and rotor exists, so that the shaft end 14' rotates in the fluid 41 at the axis of the chamber 46. In addition, the viscous fluid 41 is rotated by the rotor 17, and consequently the rotor fluid and shaft end rotate together, so that no force is applied in any direction except from the shaft through the gear 31 and rotor teeth 23 to thereby drive the rotor 17.

Under the condition wherein the drive shaft 14 becomes out of axial alignment with the rotor 17 as, for example, by movement of the base 12 in space, it will be seen that the shaft end 14' is disposed closer to one side of the chamber 46 than the other. This circumstance is schematically illustrated in FIGURE 6. In this circumstance, the fluid which is driven in a rotational motion by the viscous engagement thereof to the walls of the chamber 46 in the rotor 17 is compressed in passing by the shaft end 14' which is no longer centered in the chamber 46. The fluid is thus retarded in its rotary motion by impingement upon the shaft end 14' and, consequently, because of its viscous engagement with the rotor, exerts a drag force tangentially upon the rotor. In FIGURE 6 the arrow 51 indicates a direction of rotor rotation, and the arrow 52 indicates the like direction of fluid rotation within the rotor chamber 46. The force applied to the rotor by the fluid impinging upon the drive shaft end 14 is indicated by the dashed arrow on line 53. In actuality, it is a frictional force which is applied to the viscous fluid by the off-center drive shaft end 14' and is, in turn, transmitted to the gyro rotor by the viscous fluid 41. The application of the force 53 to the gyro rotor will result in a precession of the rotor at right angles thereto, as indicated by the arrow 54, so as to consequently reorient the rotor coaxially with the drive shaft. The amount of force applied, of course, increases with the amount of deviation from axial alignment between the drive shaft and rotor so that consequently the rotor then does reorient itself by precession into coaxial alignment with the drive shaft. The relationship of torquing force and misalignment angle can be varied by design to the requirements of particular problems. For applications to stabilized optics, it is desirable to have relatively little torque exerted at small angular displacements, with the torque increasing rather rapidly at large angles. Such a relationship is attained by this invention.

The fluid 41 will be seen to be confined to the chamber 46 and serve as a medium through which a force may be applied from the drive shaft to the rotor, wherein this force is in the proper direction and amount to precess the gyro rotor into coaxial alignment with the drive shaft. Pivoting of the drive shaft with respect to the rotor is, as noted above, possible because of the drive connection through the curved teeth 23 upon the rotor meshing with the gear 31 upon the drive shaft as to approximate a universal joint at this connection. It is to be further noted that the degree of misalignment of rotor and drive shaft is limited to a few degrees at most. However, for many applications, such as in the field of stabilized optics, no further deviation would be of interest.

In addition to the ability of the present invention as discussed above to precess a gyro rotor into continuous coaxial relationship with the drive shaft therefor, the present invention further provides for control over this precession. It is possible, in accordance with the present invention, to provide for some minimum misalignment of the axes of the drive shaft and rotor without application of a precessing force to the rotor. This may be quite readily accomplished by limiting the amount of viscous fluid placed in the rotor chamber 46, as shown in FIGURE 5. With the chamber 46 only partially filled with a viscous fluid, such as grease, high speed rotation of the rotor will, by centrifugal force, hold this viscous fluid against the walls of the chamber 46 to thereby leave an open volume about the drive shaft 14'. Slight changes in the axis of the drive shaft relative to the rotor axis will thus not engage the drive shaft end 14' with the viscous fluid, but larger deviations will move the drive shaft end 14' into engagement with the viscous fluid, and, consequently, will then exert a frictional force upon the rotor which will precess the rotor back into general coaxial alignment with the drive shaft. The amount of fluid placed within the chamber 46 thus determines the degree of freedom of variation of drive shaft axis and rotor axis without the application of a precessing force to the gyro rotor. The physical dimension radially outward from the drive shaft end to the viscous fluid held against the walls of the chamber 46 determines the permissible misalignment of shaft and rotor before there is applied a precessing force to the rotor for returning the rotor in general alignment with the shaft. Of course, it will be realized that the rotor is only acted upon by a precsssing force during that time in which the shaft is engaging the viscous fluid and that gyro precession will cease upon the sufficient realignment of rotor and shaft to remove the shaft end from the viscous fluid. Consequently, there is provided in this manner what may be called a "dead spot" in a characteristic curve of the gyro control, so that the gyro rotor will be precessed in any desired direction to follow movement of the drive shaft and, consequently, mounting base and the like, except for some predetermined amount of misalignment on either side of exact alignment.

Various other alternatives are possible with regard to the control available through this invention. There is, for example, illustrated in FIGURE 7 one variation wherein the drive shaft end 14' is provided with a plurality of radally extending paddles 61. The rotor chamber 46, instead of being entirely cylindrical of uniform diameter, as discussed above, may be altered herein to include an annular radially extended chamber portion 62, wherein the viscous fluid is entirely held by centrifugal force. The paddles 61 upon the shaft end 14' are located in alignment with the annular chamber extension carrying the fluid 41, so that a precessing force is thus applied by relative shaft and rotor misalignment to dispose the paddles 61 in the fluid 41 located in the chamber annulus 62. These paddles 61 may take a variety of different physical configurations, such as, for example, a triangular configuration illustrated in FIGURE 7, to thereby exert a desired force upon the rotor. The amount of shaft or extensions thereof, as in the form of paddles, disposed in the viscous fluid centrifugally rotated by the rotor, determines the precessing force applied to the rotor. Variation of the paddle shapes then provides a control over the characteristic of this precessing force.

Although the invention has been illustrated and described with a single fluid chamber, it is possible to provide two chambers and thus attain an additive effect. A second chamber may be provided at the other end of the rotor cylinder by sealing the outer end thereof. No internal seal 44 is then required, but an external, flexible seal is still required, and the entire cylinder bore may contain a viscous fluid. In this case misalignment of drive shaft and rotor axis causes the shaft to exert a frictional force on the rotor through the fluid near both ends of the rotor cylinder. The resulting torques are additive, i.e., in the same direction, so as to produce double the precessing torque described above.

It is not herein attempted to describe or illustrate all of the possible physical configurations that may be employed in accordance with the present invention to apply a desired and predeterminable precessing force to a gyro rotor. It is particularly noted, however, that the highly directional and precisely determinable precessing force is herein generated and applied with extreme accuracy and through the medium of an extremely simple structure. Because of the fluid nature of the force medium, i.e., the viscous fluid 41 in the rotor chamber 46, there can be no forces applied to the rotor in any other direction besides the one desired for precession of the rotor. This is in clear distinction to normal force application designs, wherein physical connection of solid elements occurs. It has heretofore only been possible to approximate the application of a truly unidirectional vector force to a gyro rotor. The present invention does accomplish this highly desirable and, in fact, necessary force application to the end of thereby producing gyro precession which has heretofore been unavailable. Although, as noted above, the present invention is not necessarily limited to gyros of any particular size, it is particularly applicable to extremely minute gyroscopes, wherein the rotor may, for example, have a maximum diameter of two inches, and consequently, the central bore 22 through the rotor cylinder has a diameter of only fractions of an inch. Despite this minute size, the present invention operates with extreme accuracy, and it has been found by extensive tests that very precise control over gyroscope rotor precession is available, in accordance with the principles of this invention.

It is not intended to limit the pesent invention by the terms of the foregoing description, nor the illustrations of specific preferred embodiments of this invention, but instead, reference is made to the following claims for a definition of the exact scope of the invention.

What is claimed is:

1. A fluid precessor for an otherwise free gyroscope comprising a shaft extending through a gyroscope rotor in rotary driving and pivoting relation thereto, said rotor defining a sealed fluid chamber into which said drive shaft extends, and a viscous fluid disposed in said chamber whereby the fluid applies a drag force on the rotor when the drive shaft approaches a chamber wall, to thereby exert a precessing torque on the gyroscope causing the axis thereof to follow the drive shaft.

2. A fluid precessor as set forth in claim 1, further defined by said fluid filling said chamber.

3. A fluid precessor as set forth in claim 1, further defined by said fluid filling only a portion of said chamber so that the fluid held against the chamber wall by centrifugal force leaves the drive shaft free of fluid for small shaft inclinations, the magnitude of which is determined by the amount of fluid in the chamber and hence the thickness of the layer thereof on the chamber wall.

4. A fluid precessor for a gyroscope as set forth in claim 3, further characterized by projections of predetermined shape extending radially from the drive shaft in said chamber for establishing the characteristic of the precessing force in accordance with the shape of the projections.

5. A fluid precessor for a gyroscope having a rotor comprising a drive shaft extending into the rotor with a short splined section at the center of the rotor, said rotor having an axial bore larger than said shaft and toothed projections about same at the rotor center for engaging said splined shaft in fixed rotational position and variable inclination of shaft and rotor axis, means closing the axial bore of said rotor at least on one side of said toothed projections, and a fluid seal about the shaft within the bore to define a cylindrical fluid chamber, and a viscous fluid disposed in said fluid chamber whereby inclination of the shaft from the rotor axis exerts a drag force on the rotor through the fluid and thus creates a right angle precessing torque causing the rotor axis to incline into alignment with the shaft axis.

6. In a gyroscope having a rotor mounted for high speed rotation by a drive shaft engaging same, the improvement comprising a pivotal rotary drive connection between said drive shaft and rotor at the central plane of the rotor on the axis thereof, means defining a sealed chamber on the axis of the rotor into which said drive shaft extends, and a viscous fluid disposed in said chamber for rotation with said rotor whereby inclination of the drive shaft with respect to the rotor axis exerts a force on the rotor through the fluid for precessing the rotor into alignment with the shaft.

7. In a gyroscope having a rotor, the improvement comprising an axial cylindrical extension of the rotor having a central bore axially of the rotor to define a chamber, a drive shaft extending into said chamber and having teeth thereabout elongated axially of the shaft, said rotor having gear teeth extending radially inward of the cylinder bore about same at the central plane of the rotor and meshing with the shaft teeth in driven relation thereto, said rotor teeth having an arcuate configuration axially of the rotor to accommodate pivoting of the shaft from coaxial alignment with the rotor and yet retain meshing drive engagement, means sealing at least a portion of said chamber about said drive shaft, and a viscous fluid disposed in said chamber about the drive shaft for rotation with the rotor and applying a frictional force to the rotor upon inclination of the drive shaft from coaxial relation to the rotor whereby the rotor is precessed into realignment with the drive shaft.

8. The improvement set forth in claim 7, further defined by said fluid having a volume less than the sealed chamber volume about the shaft so as to be held in a layer upon the chamber wall by centrifugal force with an open space about the rotor axis whereby a predetermined limited inclination of the shaft with respect to the rotor axis does not apply a force to the rotor for precessing the rotor.

9. A fluid precessor for a gyroscope having a rotatably mounted rotor adapted for driven rotation by a drive shaft comprising a central rotor portion defining an elongated bore axially of said rotor with one closed end, said shaft having peripheral gear teeth spaced from a shaft end and elongated axially of the shaft, said rotor having gear teeth extending inwardly about said bore at the central plane of the rotor with the teeth having an arcuate configuration axially of the rotor, said shaft being disposed in said bore in position to mesh the teeth thereon with the rotor teeth for rotary drive engagement with the rotor whereby such engagement is maintained through pivoted shaft positions out of axial alignment with the rotor, sealing means about said shaft engaging the rotor bore wall on the side of said shaft gear teeth toward the closed bore end for sealing a fluid chamber into which the shaft end extends, and a viscous fluid disposed in said chamber for rotation with said rotor.

10. A fluid precessor as set forth in claim 9, further defined by said viscous fluid comprising a grease.

11. A fluid precessor as set forth in claim 9, further defined by said bore having a radially extended portion in the form of an annular volume in said fluid chamber, said fluid having a volume substantially equal to said annular volume whereby the fluid is centrifugally held substantially entirely in said radially extended annular volume during rotation of the rotor, and said shaft having at least one radial extension thereon in line with the radially extended portion of said bore for engaging fluid therein upon predetermined variation of the shaft from axial alignment with the rotor.

12. In a gyroscope the improvement comprising a gyroscope rotor having an axial cylindrical portion surrounded by an annular portion, said cylindrical portion having an axial chamber extending from one open end to a closed end of the cylinder, said rotor having a set of teeth disposed peripherally about the chamber at the median plane of the rotor, a drive shaft extending axially into said chamber from the open end thereof into proximity with the closed end thereof and having a set of teeth thereabout meshing with the rotor teeth in rotary drive relation, said meshing teeth having one set thereof elongated axially of the rotor and the other set having the teeth thereof curved axially of the rotor whereby meshing drive engagement is maintained through a limited degree of misalignment of shaft and rotor axis, means sealing at least a portion of said chamber about said shaft with the shaft end in the sealed volume, and a viscous fluid disposed within the sealed volume of said chamber in a predetermined amount for transmitting to the rotor a frictional force upon predetermined variation of shaft alignment from the rotor axis to thereby precess the rotor back into axial alignment with the shaft.

No references cited.

BROUGHTON G. DURHAM, *Primary Examiner.*

T. W. SHEAR, *Examiner.*